United States Patent [19]
Rice et al.

[11] Patent Number: 5,593,753
[45] Date of Patent: Jan. 14, 1997

[54] PROTECTIVE SURFACE COVERING SYSTEMS AND METHODS OF PRODUCING SAME

[75] Inventors: Brian L. Rice, Perkiomenville; Albert J. Turansky, Slatington, both of Pa.

[73] Assignee: Illinois Tool Works Inc., Glenview, Ill.

[21] Appl. No.: 311,044

[22] Filed: Sep. 23, 1994

[51] Int. Cl.⁶ ........................................ B32B 3/10
[52] U.S. Cl. ........................ 428/131; 428/57; 428/195; 428/306.6; 428/312.4; 428/411.1; 428/688
[58] Field of Search ........................... 428/57, 143, 195, 428/306.6, 312.4, 423.1, 688, 131, 411.1

[56] References Cited

U.S. PATENT DOCUMENTS

| | | | |
|---|---|---|---|
| 3,966,657 | 6/1976 | Klatt et al. | 260/29.2 |
| 4,148,950 | 4/1979 | Brindell et al. | 427/421 |
| 4,265,957 | 5/1981 | Severance et al. | 428/143 |
| 4,392,335 | 7/1983 | Heiman | 52/309.17 |
| 4,559,263 | 12/1985 | Roodvoets | 428/312.4 |
| 4,582,889 | 4/1986 | Yamaguchi et al. | 528/59 |
| 4,761,313 | 8/1988 | Jacobs | 427/407.1 |
| 5,034,270 | 7/1991 | Ueda | 428/306.6 |
| 5,229,438 | 11/1990 | Ishida et al. | 523/428 |
| 5,245,661 | 10/1993 | Wilson | 428/57 |
| 5,356,716 | 10/1994 | Patel | 428/423.1 |

*Primary Examiner*—William A. Krynski
*Attorney, Agent, or Firm*—Synnestvedt & Lechner

[57] ABSTRACT

Disclosed is a protective covering system for use in connection with base structures that tend to generate or are subject to hydrostatic pressure. The covering system includes continuously operable pressure relief means between the substrate and a protective coating therefore. The pressure relief means relieves to the atmosphere at least a portion of the pressure generated by said base structure. Methods for producing such systems are disclosed.

30 Claims, 1 Drawing Sheet

PROTECTIVE SURFACE COVERING SYSTEMS AND METHODS OF PRODUCING SAME

The present invention is directed to protective surface covering systems, and more particularly to surface covering systems having an outer surface that is resistant to penetration by liquids and vapors.

It is known in the art to provide protective coatings over relatively pervious substrates, such as concrete, asphalt and the like. The purpose of the protective coating, which is frequently formed utilizing thermosetting resins, is to protect the substrate from attack by chemicals such as acids, alkalis, salts, oxidizing chemicals, sugars, soap and food processing substances. Exemplary coating materials that are said to be adaptable for use in connection with concrete surfaces are described in the following U.S. patents: U.S. Pat. No. 3,966,657—Klatt et al; U.S. Pat. No. 4,148,950—Brindell et al; U.S. Pat. No. 4,582,889—Yamaguchi et al; U.S. Pat. No. 4,761,313—Jacobs et al; and Ishida et al U.S. Pat. No. 5,229,438.

In certain of the prior art systems, the coating is applied to the concrete in the form of a film or layer which, because of its curing mechanism, is successively hardened from its outer surface toward the surface in contact with the concrete substrate. It has been noted that such films or layers are often subject to the presence of defects, such as pinholes and blisters on the surface. According to U.S. Pat. No. 5,034,270—Ueda, such defects are considered to be caused by the fact that gas generated during the latter stages of the curing process becomes trapped between the protective layer and the concrete base (col 1, lines 32–42). It is said that this situation causes exfoliation of and pinholes in the protective layer. In order to overcome this problem, the Ueda patent discloses the use of a plate between the concrete and the protective coating. This plate includes a plurality of holes which provide spaces for the absorption of gas produced when the coating material is cured. According to certain embodiments disclosed in the Ueda patent, a spacer is provided in addition to the plate wherein the spacer also has hollow portions for increasing the space into which the gas generated during the curing process may expand (col. 2, lines 49–54 and col. 5, lines 32–41).

Notwithstanding the solution suggested by Ueda, the delamination and blistering of protective layers has continued. Applicants have recognized that the failure to solve this long-standing deficiency is due, at least in part, to a failure of the prior art to appreciate and understand a basic underlying cause of the problem. As a result, the solutions suggested by the prior art have not been entirely effective.

Applicants have recognized that in many applications the substrate overlies a base structure that generates a flow of liquids and/or vapors. For example, in many applications a ground-slab of concrete is used in a location with a high water table or at least an intermittently high water table. Since concrete is a relatively pervious and absorbent substance, it absorbs and passes fluid materials from the earth to the protective layer. However, since the protective layer is, by definition, relatively impervious to the passage of liquids and vapors, a positive pressure is created at the interface between the protective layer and the concrete slab. Applicants have importantly and critically found that such positive pressures, which are sometimes referred to herein as externally generated hydrostatic pressures, can build to a sufficient level to cause blisters, bubbles, ripples and/or delamination of the protective coating.

SUMMARY OF THE INVENTION

In view of applicants' discoveries identified above, it is an object of the present invention to provide continuously operable pressure relief means between the substrate and the protective coating in a protective flooring system. More particularly, the system aspects of the present invention comprise a substrate which is subject to an externally generated positive pressure, a protective layer substantially overlying the substrate, and pressure relief means between the substrate and the protective layer for relieving to the atmosphere at least a portion of the positive pressure.

According to preferred embodiments, the pressure relief means comprises randomly distributed passageways fluidly connecting the substrate to the atmosphere such that a pressure differential between the atmosphere and the substrate of about 5 psi or greater causes a pressure relieving flow of fluid through said passageways.

According to further preferred embodiments, the pressure relief means comprises a pressure relief layer having an inner surface in fluid communication with the substrate and an outer surface portion in fluid communication with the atmosphere surrounding said flooring system. In such preferred embodiments, the relief layer includes at least one passageway connecting the relief layer inner surface to the portion of the outer surface which is exposed to the atmosphere.

DETAILED DESCRIPTION OF PREFERRED EMBODIMENTS

Figure 1:
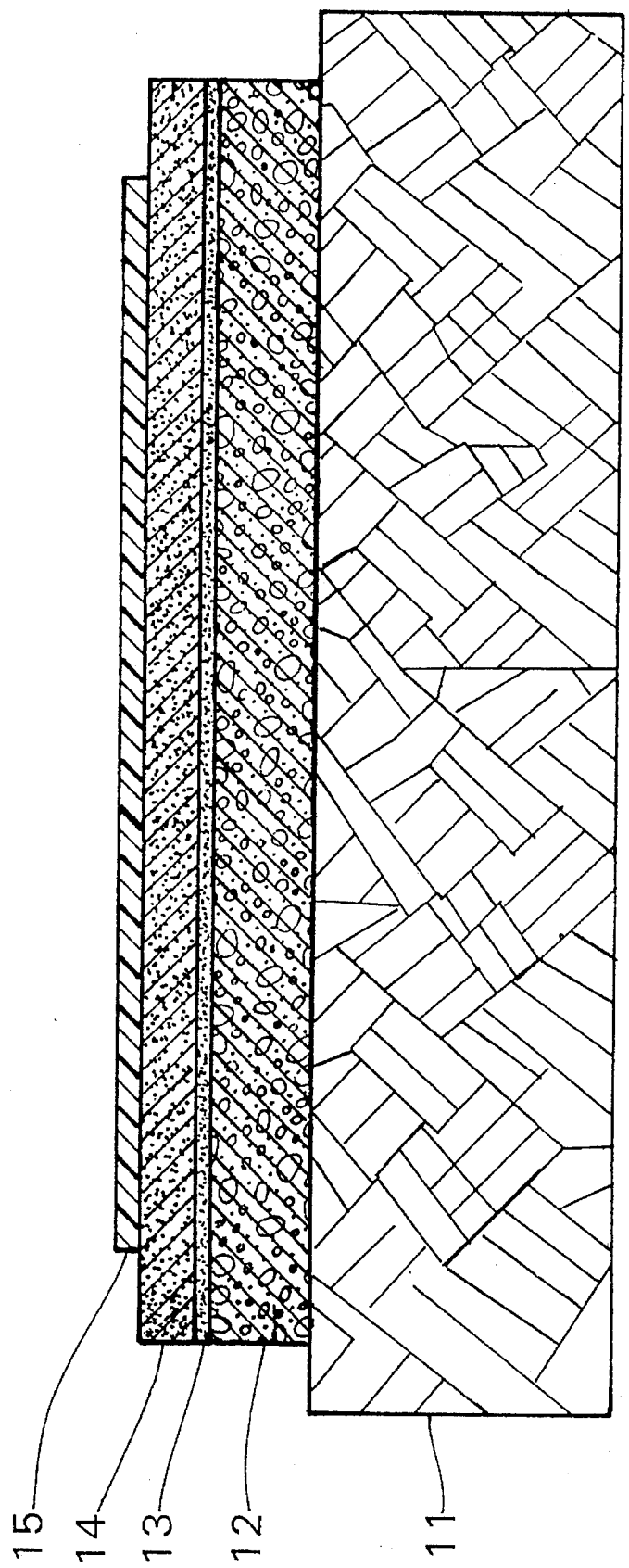
FIG. 1 is a semi-schematic, cross-sectional representation of a flooring system in accordance with one embodiment of the present invention.

The present invention is directed to surface covering systems of the type having a relatively pervious substrate and a relatively impervious protective layer overlying the substrate. An important and critical aspect of the present invention resides in the provision of pressure relief means disposed between the substrate and the protective layer. The present invention also relates to methods for preparing such protective surface covering systems in a highly efficient and economical manner.

In general, it is contemplated that numerous and varied base materials or surfaces may be covered and protected by the present systems. For example, it is contemplated that in certain embodiments the present systems may be adapted for the protection of interior surfaces of vessels or the walls of certain structures. The materials or surfaces to be covered in accordance with the present invention are sometimes referred to herein as "base structures."

The present systems are frequently referred to herein as comprising layers having "inner surfaces" and "outer surfaces." For the purposes of convenience and illustration, the term "inner surface" refers to the surface closest to the base structure being covered or protected. Conversely, the term "outer surface" is used herein to refer to the surface closest to the atmosphere surrounding the floor covering system.

I. THE SURFACE COVERING SYSTEMS

A. The Substrates

The systems of the present invention include a substrate which provides support for the overlying layers of the system. Accordingly, the term "substrate" is used herein in a broad sense to refer to one or more layers that provide a supporting structure to the overlying components thereof, particularly the pressure relief layer of the system. In many applications, such substrates also provide other desirable properties. For example, the substrate frequently also imparts compressive strength and rigidity to such systems.

In highly preferred embodiments of the present invention, the surface covering systems comprises a floor covering system in which the substrate comprises a concrete or asphalt slab or pad. Such substrates are commonly used as foundation materials in homes, garages and the like. In these type of applications, the base structure generally comprises earthen materials, such as clay, sand, topsoil and the like. Furthermore, such base structures are typically in compacted form.

B. The Pressure Relief Means

The pressure relief means of the present invention is important and critical, at least in part, because of certain features that are inherent in protective covering systems. For example, protective layers in surface covering systems, and especially in floor covering systems, function to prevent the passage of fluid materials, such as liquid water and corrosive chemical agents, through to the underlying layers of the system, and particularly to the substrate. By their nature, such protective layers also prevent the passage of fluid materials, such as liquid water and water vapor, from the underlying layers to the atmosphere. Applicants have recognized that this particular characteristic of many surface covering systems, coupled with the tendency of many base structures to produce and/or be subject to hydrostatic pressure, has been a significant factor in the undesirable tendency of such systems to produce bubbles, bumps, ripples and delamination in the surface covering. More particularly, applicants have recognized that many base structures continuously evolve, although frequently at intermittent intervals, gases and liquids. Because the substrate in such systems is frequently relatively pervious to these fluid materials, a positive fluid pressure is frequently produced at the outer surface of the substrate. Applicants have recognized that such pressure has heretofore contributed to delamination of and other defects in the system.

In view of applicants' discovery of this problem and its source, the systems of the present invention require as an essential element a pressure relief means, and preferably a pressure relief layer (sometimes referred to herein simply as "relief layer"), disposed between a relatively pervious substrate and a relatively impervious protective layer. Although the dimensions of such a relief layer will vary greatly depending upon the particular base material being covered, such pressure relief layers are generally thin relative to their length and width. Thus, although the thickness of the relief layer may vary widely, it is generally preferred that this layer have a thickness of from about 1/8 inch to about 1 inch, and even more preferably from about 3/16 inch to about 3/8 inch.

The relief layer is preferably in fluid communication with the substrate. In certain preferred embodiments, fluid communication between the pressure relief layer and the substrate is achieved by direct contact between the inner surface of the relief layer and the outer surface of the substrate. In other embodiments, one or more layers may be disposed between the substrate and the pressure relief layer, provided that such layers allow substantial fluid communication between the outer surface of the substrate and the inner surface of the pressure relief layer. For example, in certain embodiments a primer coating is preferably applied to the outer surface of the substrate prior to application of the pressure relief layer. In such embodiments, however, the primer coat is formulated so as to not substantially inhibit passage of fluid to the inner surface of the relief layer.

A portion, and preferably a substantial portion, of the outer surface of the pressure relief layer is covered by the overlying protective layer. On the other hand, a portion, and preferably a minor portion, of the outer surface of the relief layer is not covered by the protective layer. Thus, at least a portion of the relief layer surface is in fluid communication with the atmosphere surrounding the surface covering system. This feature, in combination with the porosity of the pressure relief layer, provides a surface covering system that is substantially free of bubbles, bumps, ripples, delamination and other defects caused by the presence of hydrostatic pressure in the base structure. That is, the pressure relief layer provides a passageway connecting the outer surface of the relatively pervious substrate to the atmosphere. In this way, the pressure relief layer provides means for relieving to the atmosphere sufficient pressure to substantially prevent defects caused by externally generated positive pressures. As the term is used herein, an "externally generated positive pressure" is a pressure which originates in the base structure and results in the flow of eternally generated fluid into the flooring system.

In general, the pressure relief layer is effective in relieving to the atmosphere sufficient externally generated positive pressure to prevent in the system any interfacial pressure greater than the bond strength of the weakest interfacial bond in the surface covering system. As the term is used herein, "interfacial pressure" refers to the existence of a pressure differential at the interface between any two layers. Thus, for example, an interfacial pressure may be generated at the junction between the outer surface of the relief layer and the inner surface of the protective layer. As the term is used herein, "interfacial bond strength" refers to the ability of any two adjoining layers in the surface covering system to withstand delamination. Such bond strengths are measured, for example, by standard methods for pull-off strength of coatings, such as the adhesion test described in ASTMD-4541.

It will be appreciated that the location of the weakest interfacial bond strength in systems according to the present invention will vary greatly depending upon numerous factors, including the particulars of the base structure, and the numbers and types of layers in the system. Accordingly, the pressure relieving capacity of the pressure relief layer can also vary greatly, provided it is within the broad parameters described above. According to preferred embodiments, the pressure relief layer is effective in relieving to the atmosphere at least a substantial portion of the externally generated positive pressure.

In preferred floor covering systems comprising a relatively porous concrete or asphalt substrate and an epoxy-based protective layer, applicants have found that the weakest interfacial bond frequently occurs at the junction between the outer surface of the substrate and the inner surface of the relief layer. Applicants have also found that in such preferred systems the highest interfacial pressure generally occurs at the junction between the outer surface of the relief layer and the inner surface of the protective layer. Accordingly, in such embodiments the pressure relief layer preferably comprises passage means effective to relieve sufficient externally generated positive pressure to ensure that the interfacial pressure at the inner surface of the protective layer is less than the bond strength at the interface between the substrate and the pressure relief layer.

In general, the bond strengths at the weakest interface are generally less than about 2500 psi, and commonly from about 200 psi to about 2000 psi. Accordingly, the pressure relief layer of the present invention is capable of effectively relieving sufficient pressure to insure that the highest interfacial pressure, for example, at the protective layer/relief layer interface, is less than the weakest interfacial bond strength, which is preferably about 200 psi or greater. According to certain preferred embodiments, the pressure relief means comprises means for ensuring that a pressure differential between the atmosphere and the substrate of about 5 psi or greater causes a pressure relieving flow of fluid from the substrate to the atmosphere. In this way, certain preferred systems are exceptionally effective at eliminating bumps, ripples, delaminations and the like.

The effectiveness of the relief layer according to the present invention will depend upon several factors in addition to those discussed above, including the level of the externally generated positive pressure, the type and configuration of the channel(s) provided by the relief layer, and the amount of uncovered relief layer surface. As the term is used herein, "uncovered surface" refers generally to the surface portion of the relief layer which is in fluid communication with the atmosphere.

It is expected that those skilled in the art will be able to readily determine, without undue experimentation, the particular configuration required for any particular relief layer in view of the teachings contained herein. It is generally preferred, however, that the relief layer comprise a porous layer formed from solid particulate and binder. Such a porous layer provides a large number of small, interconnecting passageways for flow of fluid from the inner surface thereof to the uncovered outer surface thereof. Furthermore, it is generally preferred that the ratio of covered surface area to uncovered surface area be no greater than about 250:1. According to certain preferred embodiments, the covered:uncovered surface area ratio is from about 50:1 to about 250:1, more preferably from about 50:1 to about 150:1, and even more preferably from about 50:1 to about 100:1.

Applicants have found that the effectiveness of the pressure relief layer according to the present invention is also influenced by the type, size, distribution and amount of particulate material used. In general, it is preferred that the particulate comprise relatively hard particulate, such as sand and the like. Applicants have found that the porosity of such preferred layers can be maximized by a judicious and unobvious selection of particulate shapes and sizes. More particularly, the relief layer preferably comprises a mixture of a first type of particulate material characterized by blocky, angular shapes and a second type of particulate characterized by generally smooth, substantially continuous shapes, such as spheres, ellipsoids and the like. For the purpose of convenience, the blocky, angularly shaped particulate material is sometimes referred to herein as "Type 1" while the smooth relatively continuous particulate material is referred to herein as "Type 2" particulate.

Applicants have also found that it is generally preferred to use a combination of Type 1 and Type 2 particulate in which the majority of Type 1 particles have a size which is substantially different than, and preferably greater than, the size of the majority of Type 2 particles. More specifically, it is generally preferred that the Type 1 particulate have an average particle size that is at least about 1.5 times greater than, and even more preferably about 2 times greater than, the average size of the Type 2 particulate. Applicants have found that this preferred combination of particulate material inhibits close packing of the particles and therefore beneficially improves the porosity of the pressure relief layer.

Applicants have also found that the relative amounts of binder and particulate in the relief layer can have a impact of the porosity thereof, and that such relative proportions can be varied, with the aid of the teaching contained herein, by those skilled in the art to help achieve the porosity desired for any particular application. In general, however, it is preferred that the particulate:binder weight ratio in the pressure relief layer be from about 5.5:1 to about 8:1, and even more preferably about 7:1.

The pressure relief layer may be formed using any suitable means known in the art. It is preferred, however, that the relief layer be formed from a relatively fluid composition which is coated or otherwise applied to the substrate. This fluid coating is then processed in situ so as to form a relatively rigid, durable pressure relief layer. According to preferred embodiments, the fluid composition comprises a suspension or dispersion of particulate material in a liquid comprising a binder and/or a binder precursor. Such a composition is preferably coated onto the substrate and hardened in situ to form the pressure relief layer. For preferred embodiments in which the binder comprises an epoxy-type resin, the fluid composition is preferably coated by troweling onto the substrate. Although not preferred, it is contemplated that the relief layer may be pre-formed and applied to the substrate as a pre-formed sheet or film.

C. The Protective Layer

As with other protective surface covering systems, a principle function of the protective layer in the present system is to protect the underlying layers of the system by inhibiting passage of deleterious agents, either in the liquid or the vapor state. In general, it is contemplated that the protective layer of the present system may be formed in a wide variety of configurations and with numerous combinations of materials. For example, the protective layer may be a single layer or a composite layer formed from a plurality of layers having either diverse or the same functions.

It is contemplated that the protective layer may be pre-formed and applied to the substrate as a pre-formed sheet or film. It is generally preferred, however, that the protective layer is applied to the relief layer in the form of a protective, curable coating. Furthermore, it is preferred that such protective coatings are resin-based coatings and even more preferably epoxy resin-based coatings.

According to certain embodiments, applicants have found that it is critically important that the protective resinous coating is formulated to at once possess excellent bonding characteristics while simultaneously having rheological properties that inhibit substantial penetration into the porous relief layer. It will be appreciated in view of the teachings contained herein that substantial penetration of such resinous coatings into the relief layer would inhibit the pressure relieving function of this layer. Furthermore, it is preferred that the resinous coating or coatings produce a protective layer that is tough, durable, and relatively impervious to liquid and gaseous agents.

In one preferred embodiment, the protective layer comprises a composite layer having an inner sub-layer and an outer sub-layer. In such embodiments, the inner sub-layer is formed from a coating composition having an ability to at once bond with the relief layer while simultaneously avoiding deleterious, channel-blocking penetration of the composition into the relief layer. The outermost layer or layers may then be formulated with particular emphasis on protective capability.

Applicants have discovered a resinous coating composition which satisfies the numerous and somewhat contradictory requirements identified above. The preferred resinous coating composition is a two-part epoxy coating in which the first part thereof (hereinafter referred to for convenience as "Part A") comprises epoxy resin while the second part (hereinafter referred to for convenience as "Part B") contains a catalyst, curing agent, hardener or the like for the epoxy resin. In general, such two part epoxy coatings are well known in the art and need not be described in detail here.

Applicants have discovered, however, that at least in certain embodiments it is critically important that the resinous coating composition comprise a relatively high molecular weight reactive component and a relatively low viscosity liquid medium for suspending, dispersing and/or dissolving the high molecular weight reactive component. As used herein, the term "relatively high molecular weight" refers to components having a molecular weight of greater than about 800. It is preferred that the weight ratio of the relatively high molecular weight component to the low viscosity liquid medium be from about 0.5:1 to about 1.25:1, and even more preferably form about 0.75:1 to about 0.9:1.

According to preferred embodiments, the relatively high molecular weight component comprise reactive epoxy resin, which, prior to mixing with the other components of the composition, is in solid particulate form. Applicants have found that in such formulations the high molecular weight epoxy resin tends to inhibit substantial penetration of the protective coating into the pores of the preferred pressure relief layers. On the other hand, the low viscosity liquid components allow the coating to wet the relief layer, thereby enhancing the bondability between the layers.

For embodiments in which the protective coating is formed from a two (2) part epoxy resin system, it is preferred that Part A of the system comprise a relatively high molecular weight solid epoxy resin and a relatively low molecular weight, liquid reactive component. Applicants have found that the use of these two components in Part A of such epoxy systems enhances bondability of the protective layer without detrimentally detracting from the relatively low penetration tendency of the coating composition. According to preferred embodiments, the relatively high molecular weight epoxy resin comprises an epoxy resin having a molecular weight of from about 800 to about 1100. In such embodiments, the liquid reactive component preferably comprises a relatively low molecular weight multi-functional monomer, and preferably a low molecular weight difunctional monomer. Preferred monomeric materials comprise diglycol ethers (hereinafter identified for convenience as "DGE") and diacrylates, including the following: DGE of 1,4 butanediol; cyclohexane dimethanol DGE; DGE of resorcinol; neopentyl glycol DGE; DGE of dibromo neopentyl glycol; 1,4 butanediol diacrylate; and tetraethylene glycol diacrylate. Applicants have found that superior results are achieved with the use of cyclohexene dimethanol DGE.

It is contemplated that the relative weight ratios of epoxy resin to monomer in Part A of the coating composition will vary depending upon the particular application in question. In general, however, it is preferred that the weight ratio of the epoxy resin to the monomer is from about 4:1 to about 1:2, and even more preferably about 1:1.

It is also preferred that Part A of the coating composition include either reactive or nonreactive diluents or solvents. Exemplary solvents include: C8–C10 aliphatic glycidyl ether; cresyl glycidyl ether; 2-ethylhexyl glycidyl ether; and p-tert-butylphenyl glycidyl ether. Once again, the amount of solvent in Part A of the composition may vary greatly; however, Part A preferably contains from about 5 to about 25 weight percent of diluent or solvent, and even more preferably from about 8 to about 20 weight percent thereof.

Applicants have found that the use of a surfactant in relatively minor proportion in Part A of the present protective coatings has advantageous results. Although it is contemplated that numerous surfactants may be adapted for use in accordance with the present invention, polysiloxanes are generally preferred. The amount of surfactant in Part A will generally be relatively small, preferably less than about 2.5 percent by weight of Part A and even more preferably less than about 1 percent by weight of Part A.

Part B of the present coating systems comprises curing agents, hardening agents, cross-linking agents and the like. Preferred are amine curing agents in liquid form. According to certain preferred embodiments, Part B consists essentially of aliphatic amines, preferably cycloaliphatic amines.

The amount of Part B in the present protective coating compositions is preferably from about 5 to about 100 parts by weight per 100 parts of part A (phA), and even more preferably from about 30 phA to about 60 phA.

II. DESCRIPTION OF THE ILLUSTRATED EMBODIMENT

With particular reference now to FIG. 1, one preferred embodiment of the present invention is shown in a semi-schematic cross sectional view. The floor covering system, designated generally as 10, provides protection for a base structure 11 comprised of a compacted earthen material. Overlying and covering at least a portion of base 11 is substrate 12 in the form of a concrete slab. Although not shown in FIG. 1, in many applications the concrete slab 12 will be enclosed by vertical walls rising, either directly or off an intermediate support, from base 11.

In the floor covering system shown in FIG. 1, a layer 13 of primer is interposed between the inner surface of the porous relief layer 14 and the outer surface of the substrate 12. The use of such a primer layer is preferred for embodiments in which it is desired to enhance the bond strength between the substrate and the pressure relief layer 14.

As illustrated in FIG. 1, protective layer 15 overlies a substantial portion of the outer surface of relief layer 14, leaving only minor peripheral portions of the relief layer exposed to the atmosphere. It will be appreciated by those skilled in the art that while the open surface area of relief layer 14 is located substantially at the periphery thereof, in certain embodiments it may be desirable to incorporate such open area in other locations.

III. EXAMPLES

Example 1—Coating Composition For The Relief Layer

A coating composition was prepared for use in forming a porous pressure relief layer in accordance with the present invention. The coating composition consisted of relatively hard particulate in the form of sand dispersed or slurried in an epoxy binder. The particulate material comprised about 35 parts by weight (pbw) of Type 1 sand and about 18 pbw of Type 2 sand. The approximate size distribution of the Type 1 and Type 2 sand is identified below:

TABLE 1

| Particulate Size Distribution | | | |
|---|---|---|---|
| Type 1 Sand | | Type 2 Sand | |
| Microns | % | Microns | % |
| 1680 | 1.2 | 840 | 1 |
| 840 | 89.4 | 590–420 | 83 |
| 590 | 7.7 | 300 | 13 |
| 420 | 1.4 | <300 | 3 |
| <300 | 0.3 | | |

The particulate material was mixed with about 8 parts by weight of a two part epoxy resin having the following formulation:

TABLE 2

| Epoxy Resin Binder | |
|---|---|
| Component | Wt % |
| Part A | |
| Epoxy Resin | 54.2 |
| Defunctional Monomer | 10.8 |
| Monofunctional Monomer | 4.3 |
| Part B | |
| Cycloaliphatic Amine | 30.7 |

Example 2—Protective Coating

A two part protective coating composition having the formulation indicated in Table 3 was prepared in accordance with the following procedure. The solid epoxy resin (Araldite GT259) was broken into pieces having a size of approximately 1–2 inch to produce resin in particulate form. The particulate resin was then placed into a drum equipped with a mixing blade and heated until dissolution (about 200° F.) while stirring slowly with the remaining ingredients until thoroughly mixed (approximately 10 minutes).

TABLE 3

| Protective Coating | |
|---|---|
| Component | Wt % |
| Part A | |
| Difunctional Monomer (Cyclohexane Dimethanol DGE) | 30.11 |
| Solid Epoxy Resin (Araldite GT 259) | 30.11 |
| Polysiloxane (BYK 530 and BYK 341) | 0.18 |
| Para-Butylphenyl Glycidyl Ether | 6.27 |
| Part B | |
| Cycloaliphatic Amine (Ancamine 2280) | 33.3 |
| | 100.00 |

Example 3—Surface Covering System

A surface covering system was prepared utilizing a substrate consisting of a concrete slab on an earthen base structure. The substrate had an outer surface area of 970 square feet. About 2000 pounds of the relief layer coating composition described in Example 1 was coated onto the substrate to a thickness of about ¼ inch using a steel trowel. After allowing to set for about 24 hours, the coating formed a porous relief layer substantially covering the concrete slab. The relief layer was then coated with about 60 pounds of the protective coating of Example 2, except that about ¾ inch from each edge of the relief layer was left uncovered by the protective coating. The protective coating was allowed to set for a period of about 24 hours to form a protective surface covering system which has been free of bubbles, ripples, bumps and delamination after three years of use.

What is claimed is:

1. A protective flooring system for covering a base structure which has the capacity to produce positive fluid pressure at the surface thereof comprising:
   (a) a fluid pervious substrate overlying the base structure;
   (b) a protective layer, said protective layer being fluid impervious relative to the fluid perviousness of said substrate;
   (c) a pressure relief layer between said substrate and said protective layer, said pressure relief layer comprising: an inner surface in fluid communication with said substrate; an outer surface having at least a first portion and a second portion, said first portion being in fluid communication with the atmosphere surrounding said flooring system, said protective layer overlying a major portion of said second portion such that said major portion of said second portion is blocked by said protective layer from fluid communication with the atmosphere surrounding said flooring system; and a passageway connecting said relief layer inner surface to said first portion of said relief layer outer surface such that said relief layer maintains sufficient fluid communication between said atmosphere and said substrate to ensure that the greatest interfacial pressure in the system is less than about 200 psi.

2. The system of claim 1 wherein said substrate comprises concrete.

3. The system of claim 1 wherein said pressure relief layer has a thickness of from about ⅛ inch to about 1 inch.

4. The system of claim 1 wherein the ratio of second portion surface area to first portion surface area is no greater than about 250:1.

5. The system of claim 4 wherein the ratio of said second portion surface area to said first portion surface area is from about 50:1 to about 150:1.

6. The system of claim 1 wherein said relief layer maintains sufficient fluid communication between said atmosphere and said substrate to ensure that the highest interfacial pressure in the system is less than about 5 psi.

7. A surface covering system comprising:
   (a) a substrate which has the capacity to produce a positive fluid pressure;
   (b) a protective layer overlying a substantial portion of said substrate; and
   (c) pressure relief layer between said substrate and said protective layer, said protective layer overlying a major portion of said pressure relief layer and not overlying a minor portion of said pressure relief layer, said pressure relief layer being in fluid communication with the atmosphere for relieving to the atmosphere at least a substantial portion of said fluid pressure from said substrate such that the highest interfacial pressure in the system is less than about 200 psi, said pressure relief layer comprising a porous layer formed from solid particulate and binder.

8. The system of claim 7 wherein the said substrate comprises concrete.

9. The system of claim 7 wherein said solid particulate comprises sand.

10. The system of claim 7 wherein said particulate comprises type 1 particulate and type 2 particulate.

11. The system of claim 10 wherein said type 1 particulate has an average particle size that is at least about 1.5 times greater than the average particle size of said type 2 particulate.

12. The system of claim 7 wherein the particulate:binder weight ratio is from about 5.5:1 to about 8:1.

13. A water resistant and chemical resistant flooring system for covering a base structure, said system being of the type having a relatively liquid pervious and vapor pervious substrate having an inner surface in contact with the base and an outer surface, and a protective layer overlaying said substrate, said protective layer being impervious to the passage of liquid water and water vapor relative to the perviousness of said substrate, said system comprising a continuously operable pressure relief layer between said substrate and said protective layer, said pressure relief layer comprising:

(a) an inner surface in intimate contact with and bonded to the outer surface of said substrate and comprising a plurality of randomly distributed ingress openings in fluid communication with the outer surface of said substrate for permitting ingress of liquid water and/or water vapor under positive pressure from the outer surface of said substrate, (b) an outer surface spaced from and substantially parallel to the inner surface of said relief layer, at least a portion of the outer surface of said relief layer being in fluid communication with the atmosphere surrounding said flooring system and having a plurality of randomly distributed egress openings therein, and (c) passageways connecting said randomly distributed ingress openings and egress openings such that a pressure differential of at least about 5 psi causes a pressure relieving flow of fluid from said ingress openings to said egress openings.

14. The system of claim 13 wherein said substrate comprises concrete.

15. The system of claim 13 wherein said pressure relief layer comprises a porous layer formed from solid particulate and binder.

16. The system of claim 13 wherein the ratio of the total outer surface area of said relief layer to the surface area of said relief layer include communication with the atmosphere is no greater than about 250:1.

17. A surface covering system comprising:

(a) a substrate layer having the capacity to emanate a fluid to create an interfacial pressure between the layers of said system;

(b) a protective layer being impervious to said fluid; and (c) a pressure relief layer between said substrate and said protective layer such that said pressure relief layer overlies said substrate and said protective layer substantially overlies said pressure relief layer while leaving at least one uncovered portion of said pressure relief layer exposed to the atmosphere, said pressure relief layer comprising a porus material enabling fluid communication between said substrate and said uncovered portion, said fluid communication being sufficient to vent said fluid to said atmosphere such that the highest interfacial pressure between said substrate and said protective layer is less than the minimum bond strength between said layers.

18. The system of claim 17, wherein said porus material is formed from solid particulate and binder.

19. The system of claim 18, wherein the said substrate comprises concrete.

20. The system of claim 19, wherein said particulate comprises sand.

21. The system of claim 18 wherein said particulate comprises type 1 particulate and type 2 particulate.

22. The system of claim 21 wherein said type 1 particulate has an average particle size that is at least about 1.5 times greater than the average particle size of said type 2 particulate.

23. The system of claim 18 wherein the particulate:binder weight ratio is from about 5.5:1 to about 8:1.

24. A protective flooring system for covering a base structure which has the capacity to emanate a fluid at the surface thereof to generate an interfacial pressure between the layers of said system, said system comprising:

(a) a substrate layer overlying said base structure, said substrate layer being pervious to said fluid;

(b) a protective layer being impervious to said fluid; and (c) a pressure relief layer comprising:
an inner surface overlying and in fluid communication with said substrate;
an outer surface being substantially overlaid by said protective layer but having at least one uncovered portion exposed to and in fluid communication with said atmosphere; and
a passageway connecting said inner surface to said uncovered portion of said outer surface, said passageway enabling fluid communication between said substrate layer and said atmosphere, the fluid communication being sufficient to vent said fluid to said atmosphere such that the highest interfacial pressure in the system is less than the minimum bond strength between said layers.

25. The system of claim 24 wherein said substrate comprises concrete.

26. The system of claim 24 wherein said pressure relief layer has a thickness of from about ⅛ inch to about 1 inch.

27. The system of claim 26 wherein the ratio of second portion surface area to first portion surface area is no greater than about 250:1.

28. The system of claim 27 wherein the ratio of said second portion surface area to said first portion surface area is from about 50:1 to about 150:1.

29. The system of claim 24 wherein said highest interfacial pressure in the system is less than about 200 psi.

30. The system of claim 29 wherein a pressure differential between the highest interfacial pressure in the system and said atmosphere of greater than about 5 psi causes said fluid to vent to said atmosphere through said pressure relief layer.

* * * * *